United States Patent Office 3,214,220
Patented Oct. 26, 1965

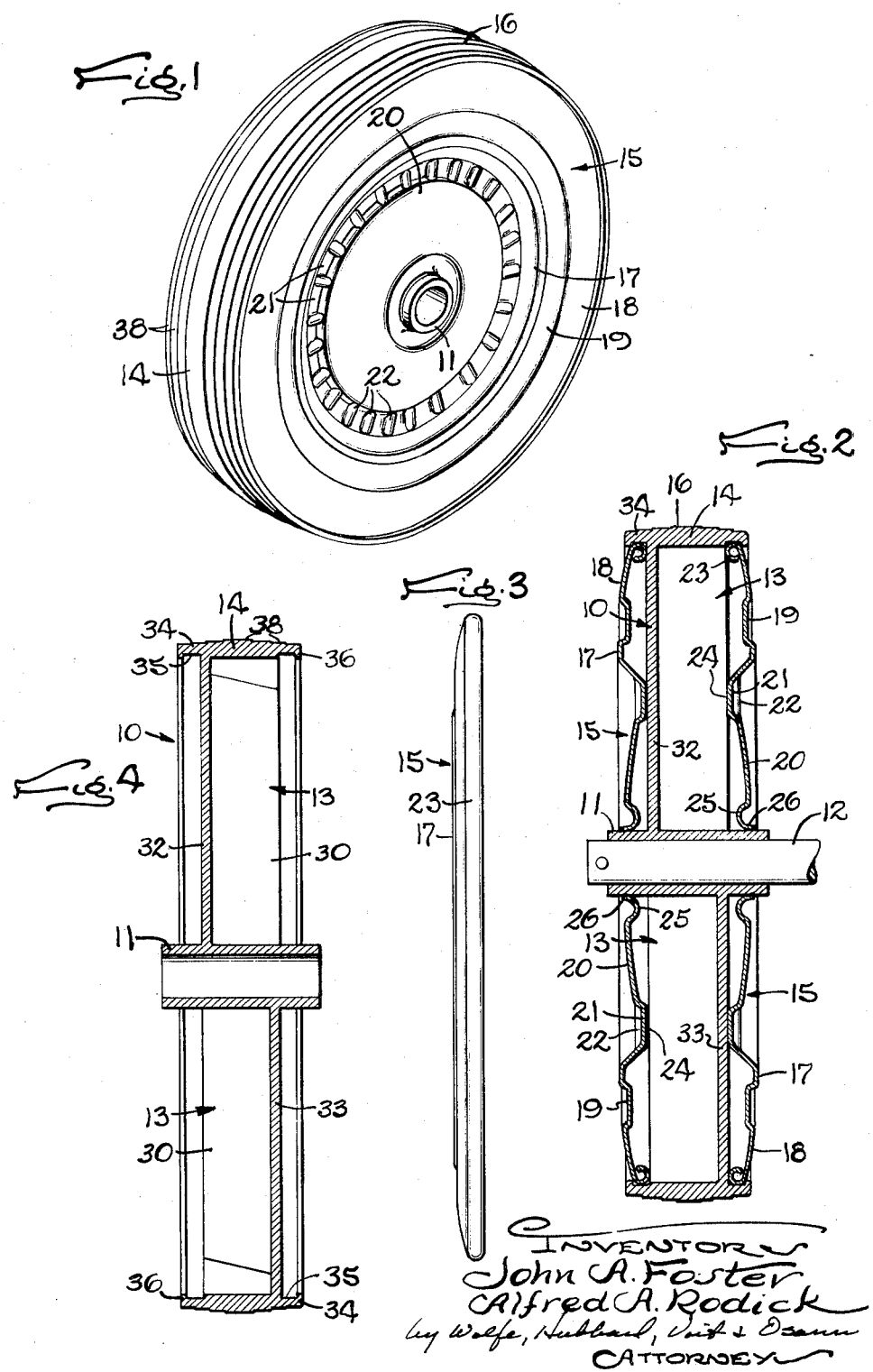

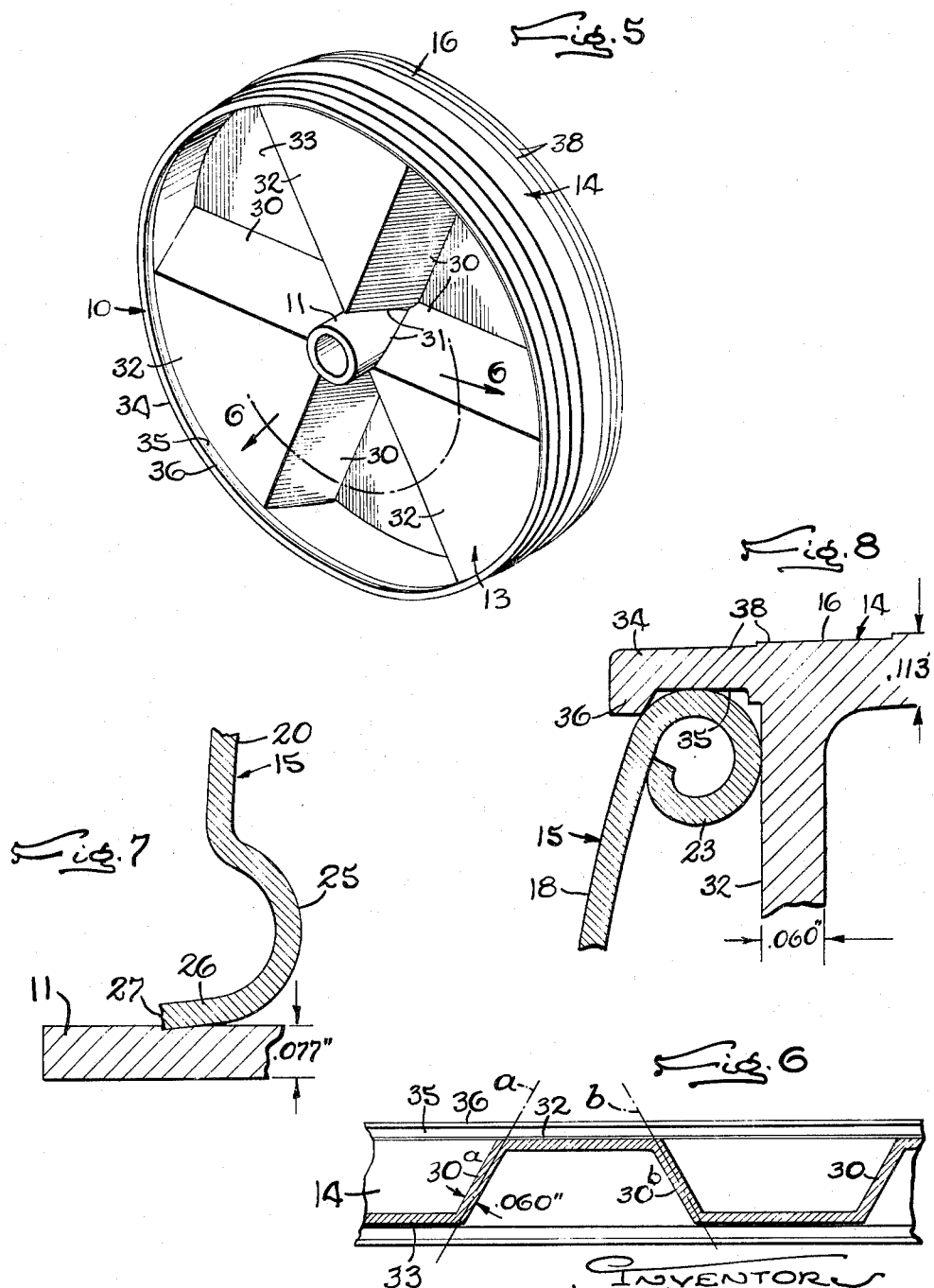

3,214,220
PLASTIC WHEEL WITH SHEET
METAL SIDEWALL
John A. Foster, Rockford, and Alfred A. Rodick, Park Ridge., Ill., assignors to J. L. Clark Manufacturing Co., Rockford, Ill., a corporation of Illinois
Filed Dec. 27, 1963, Ser. No. 333,902
15 Claims. (Cl. 301—63)

This invention relates to a wheel for toy vehicles, grilles, yard carts and the like comprising an assembly of a tire tread of molded plastic and a sheet metal disk decorated to simulate the appearance of the outer face of an automotive vehicle wheel and tire.

The general object is to take advantage of modern techniques in the predecoration of later drawn and die shaped sheet metal parts and provide a wheel of the above character which, as compared to prior simulated automotive wheels, is as sturdy and durable in construction and as inexpensive to manufacture and yet can be decorated much more realistically to simulate the elements of a modern automotive vehicle wheel including a white side wall tire, painted or chromium spokes, and a brilliant hub cap.

Another object is to achieve the foregoing by combining with a predecorated sheet metal disk a single piece plastic molding which not only forms the tire tread and axle journal but also incorporates a connecting spoke structure which reinforces and supports the disk and itself sustains a substantial part of the wheel load.

A further object is to provide a novel construction of the plastic part which facilitates molding thereof in a single piece without danger of warping or other deformation during cooling while providing for proper distribution of the wheel loads to the axle through the metal disk and spoke structure.

The invention also resides in the novel manner of coupling the metal disk to the tire tread and to the axle by which the wheel is supported.

Other objects and advantages of the invention will become apparent from the following detailed description taken in connection with the accompanying drawings in which FIGURE 1 is a perspective view of a wheel embodying the novel features of the present invention.

FIG. 2 is a diametrical cross-section.

FIG. 3 is a side view of one of the predecorated sheet metal side panels.

FIG. 4 is a view similar to FIG. 2 with the side panels removed.

FIG. 5 is a perspective view of the molded plastic part of the wheel.

FIG. 6 is a fragmentary section taken on the line 6—6 of FIG. 5.

FIGS. 7 and 8 are enlargements of portions of FIG. 2.

In the form shown, the improved combination molded plastic and decorated sheet metal wheel comprises generally a single piece plastic molding 10 (FIG. 5) forming the body of the wheel and providing a tubular hub 11 for receiving a supporting axle 12 (FIG. 2), a spoke structure 13 and an outer rim 14 which, together with the hub, receives and supports a predecorated and preformed disk or face panel 15 which not only imparts a realistic appearance simulating that of an automotive wheel but also transmits a substantial part of the impact load from the tread surface 16 to the hub 11 and the axle extending therethrough. The remainder of the radial load is transmitted directly through the medium of the spoke structure 13 which performs the additional function of reinforcing and forming a backing for the decorated disk 15. Thus strengthened against axial deflection, the disk is able to sustain its share of the total load even though constructed of relatively thin sheet metal, for example, .014 of an inch thick.

Sheet metal of such thinness may be decorated in the flat with intricate and multicolor designs by modern lithographic printing techniques and thereafter drawn or die formed into almost any desired contour for imparting rigidity or other structural properties. Accordingly, a disk of sheet metal somewhat larger than the full wheel diameter is, by multicolor lithographic printing, decorated with band-like areas 17 and 18 representing the inner and outer portions of the side wall of an automotive tire, these areas being separated by a white area 19 so as to simulate a white side wall tire. A circular area 20 at the center of the disk is colored to represent a chromium hub cap of substantial size. Between these areas may be background sectors 21 of any desired color representing the spaces between short spokes 22 of brilliant coloring as sometimes found in the wheels of sports automobiles.

To impart rigidity to and reinforce the disk and also emphasize the decorative effects above described, the outer edge portion of the disk is rolled inwardly to form a curl 23 of circular cross-section while the adjacent tire simulating area 18 is bulged outwardly but indented by a shallow groove whose bottom constitutes the side wall stripe 19. The hub cap portion 20 is rounded gently while the simulated short spokes 22 are radial ribs embossed out of the bottom of a groove pressed inwardly between the tire and hub cap areas to form a rib 24 on the inner side of the disk. As will appear later, the curl of the disk is seated in the end portion of the tread ring 14 which projects outwardly beyond the outer periphery of the spoke structure 13.

The inner edge portion of the disk is strengthened by depressing the metal thereof to form an inwardly projecting rib 25 generally semi-circular in cross-section and terminating in a slightly coned and outwardly tapering peripheral flange 26 whose edge 27 is rough and jagged and slightly smaller than the outer diameter of the plastic hub 11. As a result, when the disk is pressed onto the end portion of the hub which projects axially beyond the spoke structure 13, the edge 27 is bent outwardly and, in its final position bites into the plastic as shown in FIG. 7 thus locking the disk securely against reverse or outward shifting along the hub. At the same time, the flange 26 forming the inner surface of the rigid reinforcing rib 25 provides a substantial area of engagement with the plastic hub.

In accordance with an important aspect of the present invention, the thickness of the different cross-sections of the plastic molding and the location of the spoke structure is such that these parts may be molded from suitable plastic material into the desired shape without danger of the molding becoming deformed appreciably as an incident to cooling and solidifying of a piece of such intricate shape. To these ends, the ring 14, the parts of the spoke structure 13, and the tubular hub 11 are all made of roughly the same cross-sectional thickness so that upon cooling from the molten state, the plastic forming these parts will not, on cooling, shrink unevenly to a degree sufficient to produce objectionable deformation in the tread surface 16 or its angular relation with respect to the hub 11. In the present instance, the desired accuracy in the molding operation is achieved by employing a non-brittle plastic such as polypropylene cast in mating dies to the approximate dimensions indicated in FIGS. 6 to 8. It will be apparent that the ring 14 forming the tread surface 16, the parts of the spoke structure 13, and the hub 11 are of roughly the same cross-sectional thickness which, in the plastic molding operation, makes for solidification of all parts without objectionable uneven shrinkage.

Such plastic is tough and somewhat yieldable thus allowing sufficient flexing of the parts of the molding to effect transmission of a proper part of the load through the reinforced disk 15.

To support the tread ring substantially across its full width maintaining approximate uniformity of the cross-sectional thickness between this ring, the hub 11 and the spoke structure 13, the latter is composed of angularly spaced pairs, three in the present instance, of radially extending spokes or webs 30ª and 30ᵇ. The inner ends of the webs are integral with the periphery of the hub 11 as indiacted at 31 (FIG. 5) intermediate the ends thereof while the outer ends are cast integral with the inner wall of the tread ring 14. Herein, the webs are relatively flat and of uniform width and disposed in planes extending across the tread ring 14 and the wheel axis. To facilitate withdrawal of the molded piece from the casting dies, the webs 30ª and 30ᵇ of each pair are not disposed in true radial planes but are oppositely inclined relative to such planes as to converge axially in one direction toward each other as best shown in FIG. 6.

In the present instance, the edges of alternate pairs of the webs 30ª and 30ᵇ on one side of the wheel are joined by a set of three flat and triangular spokes or webs 32 lying in the transaxial plane of the edges of these webs while the edges of the webs 30ª and 30ᵇ on the opposite side of the wheel are rigidly joined by similar webs 33 lying in a transaxial plane axially spaced from the webs 32 and each overlying a space between two of the webs 32 as shown in FIG. 5. In the final assembly (FIG. 2), the webs 32 and 33 and the edges of the webs 30ª and 30ᵇ lie against the inner faces of the ribs 24 between the simulated spokes 22 of the disk 15 thus providing a rigid backing for this well reinforced area which is disposed about midway between the inner and outer edges of the disk. Inward bowing of the latter under loads encountered in service use is thus prevented.

With the disk 15 thus abutting the webs 32 or 33, opposite end portions 34 of the tread ring 14 overhang the spoke structure and are formed with an internal groove 35 in which the inturned curl 23 on the disk seats as shown in FIGS. 2 and 8. The outer wall of this groove is defined by a narrow flange 36 turned inwardly from the extreme edge of the tread ring and spaced from the webs 32 a distance only slightly greater than the axial thickness of the curl which, in the final assembly, seats against the flange, the web, and the bottom of the groove 35 as shown in FIG. 8.

The overhanging end portions 34 of the tread ring are made relatively thin so that, when made of plastic of the character above described, they will expand and permit the rigid curl to pass the flange 36 and snap in behind the latter as each disk 15 is pressed into the recess defined by this flange. As a preliminary to this, the disk is centered on the plastic body 10 and then pressed bodily toward and against the spoke structure during which the end portion 34 of the tread ring is expanded to receive the curl and the edge of the center flange 26 expands and slides along the hub until the depressed rib 24 of the disk comes against the webs 32. The sharp and somewhat jagged edge 27 of the flange 26 bites into the plastic of the hub to a depth sufficient to lock the center of the disk securely against reverse movement outwardly along the hub. As a result, the disk is held effectually against outward axial displacement. That is to say, in spite of the heavy impact loads likely to be encountered in service use, the curl 23 is held seated in the groove 35 and with the intermediate area of the disk backed by the spoke structure 13 thus preventing inward bowing of the disk.

To insure proper distribution of the wheel loads between the spoke structure and the metal disks, the tread surface 16 is crowned slightly. This is accomplished in the present instance by dividing the surface into shallow and narrow cylindrical steps 38 (FIG. 7) which decrease outwardly from a high line at the center plane of the ring 14. By such crowning, the contact between the wheel and a supporting surface will always occur intermediate the ends of the ring. Loads on the wheel are thus applied not only to the spoke structure 13 but are also distributed by the tread ring and applied to both of the metal disks 15.

It will be apparent from the foregoing that plastic and sheet metal parts are constructed to possess optimum individual strength for sustaining radial loading while being joined in the assembly in a novel manner such that the two not only reinforce and strengthen each other but also insure proper distribution of the loads between the plastic spoke structure and the decorated sheet metal disks. As a result, both parts may be of relative thin sections using a minimum amount of material and manufactured at low cost by high production sheet metal printing and stamping equipment and plastic molding machines. By lithographing the disks while flat, any desired surface pattern may be achieved at low cost and without the necessity of finish decorating after assembly of the wheel parts.

We claim as our invention:

1. A wheel comprising a relatively thin and somewhat flexible cylindrical ring having an external surface constituting a tire tread, a plurality of radially disposed and angularly spaced spokes integrally joined at their outer ends to and extending across the inner wall of said ring and defining a spoke structure axially narrower than the length of said ring and having an integral hub defining a central hole therethrough for receiving a supporting axle, said spoke structure, said hub, and said ring being a single piece molding of somewhat yieldable plastic material which is sufficiently uniform in thickness at all cross-sections to permit cooling of the plastic after molding without objectionable deformation of said ring, and a disk of sheet metal having a central flange axially alined with said hole for receiving said axle and an outer peripheral edge press-fitted into one end of said ring whereby the radially directed impacts applied to said tread ring are divided between and are transmitted inwardly through the medium of said disk and said spoke structure.

2. A wheel as defined in claim 1 in which adjacent ones of said spokes converge toward each other in one direction along the wheel axis.

3. A wheel as defined in claim 1 in which said spokes abut against and form a backing for said disk to prevent inward axial flexing thereof.

4. A wheel comprising a relatively thin and somewhat flexible ring having an external surface constituting a tire tread, a plurality of angularly spaced radially extending spokes integrally joined at their outer ends to the inner wall of said ring and defining a spoke structure axially narrower than the length of said ring with one end portion of the ring projecting axially beyond said spoke structure to overhang one side of the latter, a tubular hub coaxial with said ring and integrally joined to the inner ends of said spokes with one end of the hub projecting axially beyond said one side, said hub, said ring and said spoke structure being a single piece molding of somewhat flexible plastic material of substantially uniform cross-sectional thickness, and a disk of resiliently flexible sheet metal having a central aperture telescoped snugly over said hub end and an outer peripheral edge press-fitted into said projecting end portion whereby radially directed impacts applied to said tread ring are divided and transmitted to said hub in part through said spoke structure and in part through said disk.

5. A wheel comprising a relatively thin and somewhat flexible plastic ring having an external surface constituting a tire tread, a plurality of angularly spaced radially extending plastic spokes integrally joined at their outer ends to the inner wall of said ring and defining a spoke structure axially narrower than the length of said ring with one end portion of the ring projecting axially beyond said spoke structure to overhang one side of the latter, a tubular plastic hub coaxial with said ring and integrally joined to the inner ends of said spokes with one end of the hub projecting axially beyond said one side, a disk of resiliently flexible sheet metal having a central aperture telescoped over said hub end and an outer peripheral edge fitted into said projecting end portion, said disk having surfaces for abutting against said spoke structure between said ring and said hub, and means for locking said disk in said ring and on said hub whereby radially directed impacts applied to said tread ring are divided and transmitted to said hub in part through said spoke structure and in part through said disk.

6. A wheel comprising a relatively thin and somewhat flexible plastic ring having an external surface constituting a tire tread, a plurality of angularly spaced radially extending plastic spokes integrally joined at their outer ends to the inner wall of said ring and defining a spoke structure axially narrower than the length of said ring with one end portion of the ring projecting axially beyond said spoke structure to overhang one side of the latter, a tubular plastic hub coaxial with said ring and integrally joined to the inner ends of said spokes with one end of the hub projecting axially beyond said one side, a disk of resiliently flexible sheet metal having a central aperture telescoped over said hub end and an outer peripheral edge fitted into said projecting end portion, and means for locking said disk in said ring on said hub whereby radially directed impacts applied to said tread ring are divided and transmitted to said hub in part through said spoke structure and in part through said disk.

7. A wheel comprising a relatively thin and somewhat flexible plastic ring having an external surface constituting a tire tread, a plurality of angularly spaced radially extending plastic spokes integrally joined at their outer ends to the inner wall of said ring and defining a spoke structure axially narrower than the length of said ring with one end portion of the ring projecting axially beyond said spoke structure to overhang one side of the latter, a tubular plastic hub coaxial with said ring and integrally joined to the inner ends of said spokes with one end of the hub projecting axially beyond said one side, and a disk of resiliently flexible sheet metal having a central aperture telescoped snugly over said hub end and an outer peripheral edge press-fitted into said projecting end portion whereby radially directed impacts applied to said tread ring are divided and transmitted to said hub in part through said spoke structure and in part through said disk.

8. A wheel as defined in claim 7 in which said spoke structure is positioned adjacent the inner side of said disk to abut against the disk between said hub and said ring thereby to back the disk against inward axial flexing.

9. A wheel as defined in claim 7 in which said aperture is defined by the free edge of an annular flange extending axially away from said spoke structure and tapering toward said free edge to a size smaller than said hub whereby said edge bites into the hub to lock the disk thereon.

10. A wheel as defined in claim 5 in which the outer periphery of said disk comprises a curl seated in an internal groove in said projecting end of said tread ring and engaging the latter with a snap fit.

11. A wheel as defined in claim 7 in which said spokes are angularly spaced apart in a first transaxial plane adjacent the inner side of said disk.

12. A wheel as defined in claim 11 in which said spoke structure also includes a plurality of second spokes angularly spaced apart in a second transaxial plane at the other side of the spoke structure and each overlying a space between two of the spokes in said first plane.

13. A wheel as defined in claim 12 further including a plurality of flat webs extending between said planes and connecting the adjacent edges of two spokes in the respective planes.

14. A wheel comprising a relatively thin and somewhat flexible cylindrical ring having an external surface constituting a tire tread, a tubular hub concentric with the axis of said ring, a plurality of first radially extending flat spokes angularly spaced around said hub and disposed in planes extending across said ring and forming a spoke structure integrally joining the interior of the ring with the exterior of said hub while leaving at least one end of the ring and hub projecting axially beyond such spoke structure, a series of second flat spokes disposed in transaxial planes and integrally joining alternate pairs of the edges of said first spokes on one side of said spoke structure, a similar series of third flat spokes similarly joining the other adjacent edges of said first spokes on the opposite side of said spoke structure, said first, second and third spokes, said hub, and said ring being a single piece molding of somewhat flexible plastic material which is sufficiently uniform in thickness at all cross-sections to permit cooling of the plastic after molding without objectionable deformation of said ring and hub, and a disk of sheet metal having a central flange snugly telescoped over one end portion of said hub and an outer peripheral edge press-fitted into said projecting end of said ring whereby the radially directed impacts applied to said tread ring are divided and transmitted directly to said hub through the medium of said disk and said spoke structure.

15. A wheel comprising a relatively thin and somewhat flexible cylindrical ring having an external surface constituting a tire tread, a tubular hub concentric with the axis of said ring, a plurality of radially extending spokes angularly spaced around said hub and disposed in planes extending across said ring and along the wheel axis and forming a spoke structure integrally joining the interior of the ring with the exterior of said hub while leaving at least one end of the ring and hub projecting axially beyond such spoke structure, said spokes, said hub and said ring being a single piece molding of flexible plastic material which is sufficiently uniform in thickness at all cross-sections to permit cooling and solidifying of the plastic after molding without objectionable deformation of said ring and hub, and a disk of sheet metal having a central flange snugly telescoped over one end portion of said hub and an outer peripheral edge press-fitted into said projecting end of said ring whereby the radially directed impacts applied to said tread ring are divided and transmitted directly to said hub through the medium of said disk and said spoke structure.

References Cited by the Examiner

UNITED STATES PATENTS

| 1,659,387 | 2/28 | Adel | 301—63 |
| 2,686,549 | 8/54 | Henry | 152—7 |
| 3,020,091 | 2/62 | Solomon | 301—63 |
| 3,048,447 | 8/62 | Klint | 301—5 X |

FOREIGN PATENTS

| 720,900 | 12/54 | Great Britain. |
| 928,956 | 6/47 | France. |

ARTHUR L. LA POINT, *Primary Examiner.*